No. 681,620. Patented Aug. 27, 1901.
F. B. COOK.
VEHICLE BRAKE MECHANISM.
(Application filed July 9, 1901.)
(No Model.)
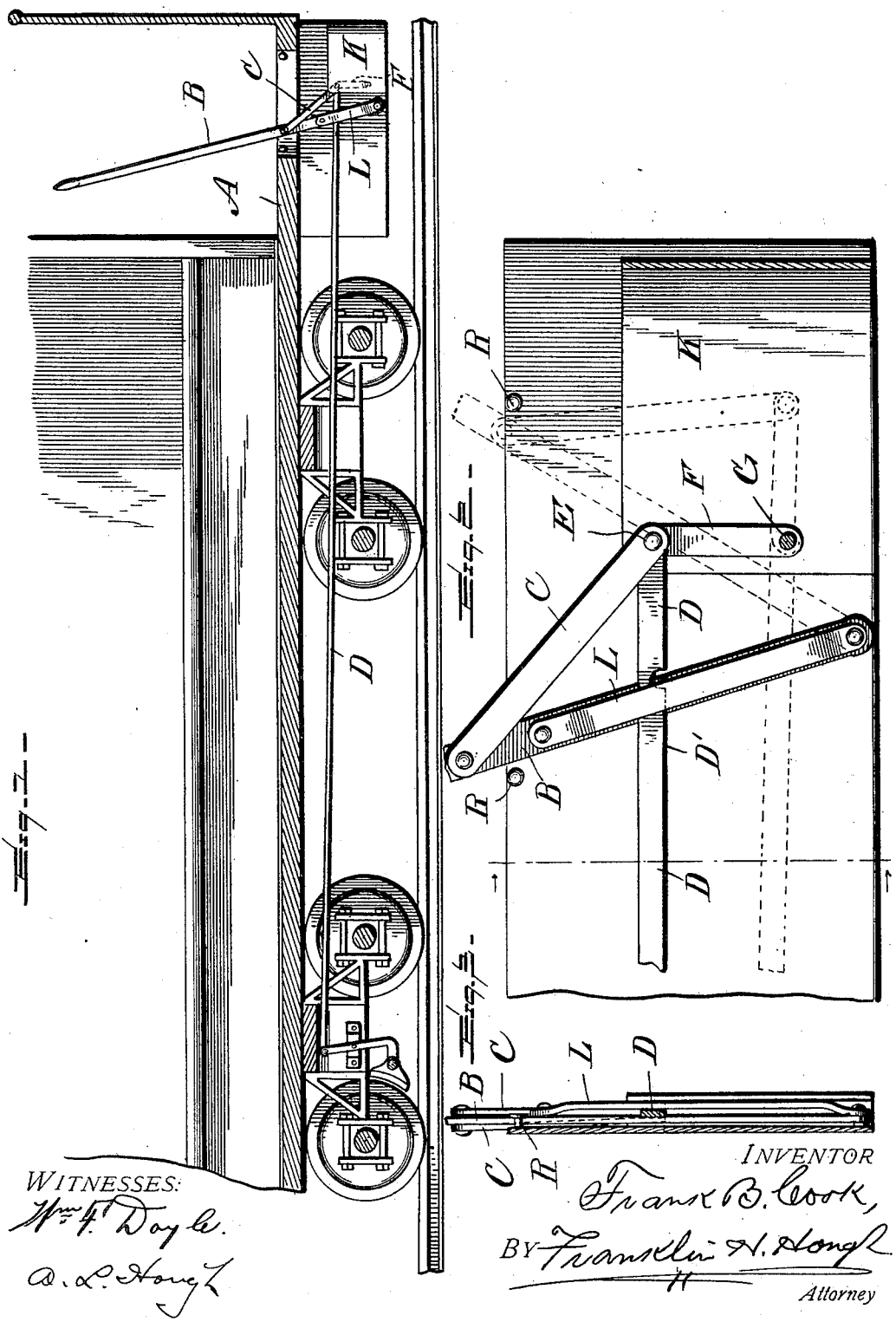
WITNESSES:
Wm. F. Doyle.
A. L. Hough.
INVENTOR
Frank B. Cook,
BY Franklin H. Hough
Attorney ature in presence of two witnesses.
UNITED STATES PATENT OFFICE.

FRANK BURTON COOK, OF OSKALOOSA, KANSAS.

VEHICLE BRAKE MECHANISM.

SPECIFICATION forming part of Letters Patent No. 681,620, dated August 27, 1901.

Application filed July 9, 1901. Serial No. 67,646. (No model.)

*To all whom it may concern:*

Be it known that I, FRANK BURTON COOK, a citizen of the United States, residing at Oskaloosa, in the county of Jefferson and State of Kansas, have invented certain new and useful Improvements in Vehicle Brake Mechanism; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in brake apparatus designed for use on street-cars and other vehicles, and in carrying out the present invention I improve upon the construction of apparatus upon which I have been granted Letters Patent No. 677,307; and it consists in various details of construction, which will be hereinafter more fully described, and then specifically defined in the appended claims.

The invention is clearly illustrated in the accompanying drawings, which, with the letters of reference marked thereon, form a part of this application, and in which—

Figure 1 is a central longitudinal section of a street-car, showing my improved brake apparatus applied thereto. Fig. 2 is an enlarged detail view of the apparatus detached from the car. Fig. 3 is a cross-sectional view on line 3 3 of Fig. 2.

Reference now being had to the details of the drawings by letter, A designates the platform of a car, and pivoted to said platform is the lever B, to which are pivoted the upper ends of the links C. These links C carry a pivotal pin E at their lower ends, on which the brake-lever D is mounted. Links F F are also pivotally mounted on said pin E, and their lower ends are pivotally mounted on a pin G, which passes through registering apertures in the guard-plate K. These two links F F are spaced apart, and the pivotal end of said brake-lever is mounted between said links. The under edge of the lever D is notched, as at D', said notch being adapted to engage over the pin G when the lever D is at its farthest forward limit. When said lever is in this position, it will rest between the links F F, the three lying in horizontal positions.

The guard-plate K is made by bending a piece of sheet metal upon itself and guides and protects the links F F and the ends of the lever and links pivoted thereto.

To guide the lever D in its movements, a bar L is employed, which is mounted at its lower end on the pin on which said lever B is pivoted. If preferred, however, this guard-bar L may be made of an extension of the lever B bent upon itself, with a space left for the brake-lever to move backward and forward. To limit the throw of the lever B, stops R are fastened to the frame of the car, as shown.

Having thus described my invention, what I claim to be new, and desire to secure by Letters Patent, is—

1. A brake, comprising in combination with the platform of a car, a lever B pivoted to said platform, the brake-lever and links pivotally connecting same with said lever B, links pivoted to the platform and to the end of said brake-lever, and means for holding the brake-lever at its farthest forward limit, as set forth.

2. A brake, comprising in combination with the car, a lever B pivoted thereto, a brake-lever and links pivotally connecting same with said lever B, links pivoted to the car and to the forward end of said brake-lever, means for holding the latter at its farthest forward limit, and a guard-plate mounted over the pivotal ends of said links, as set forth.

3. In combination with the car, the lever B, the brake-lever and guard-bar secured to said lever B, the links connecting the inner end of said brake-lever with the lever B, the links pivoted to said brake-lever, the guard-plate bent upon itself, a pivotal pin mounted thereon, said brake-lever being notched and adapted to engage over said pivotal pin when said lever is at its farthest forward limit, as set forth.

In testimony whereof I hereunto affix my signature in presence of two witnesses.

FRANK BURTON COOK.

Witnesses:
   CHAS. F. JOHNSON,
   G. BRINER.